April 26, 1966 F. F. COOK 3,247,730
UNLOADING APPARATUS
Filed Sept. 30, 1963 2 Sheets-Sheet 2
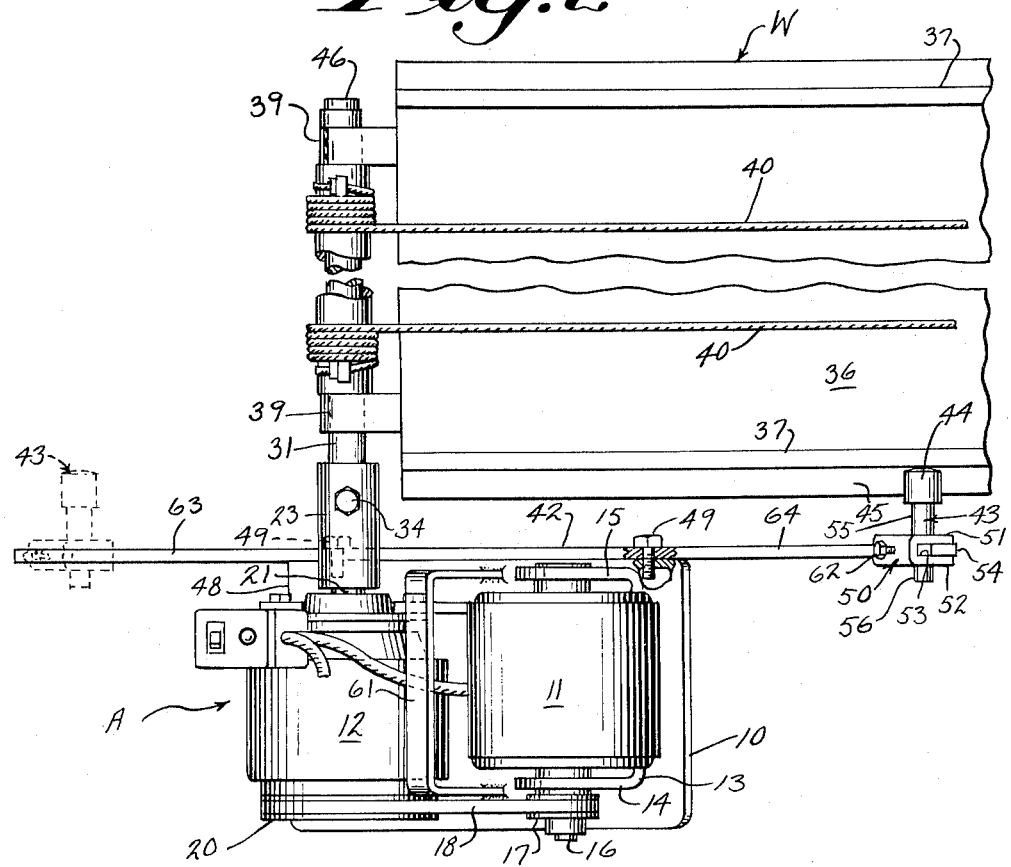
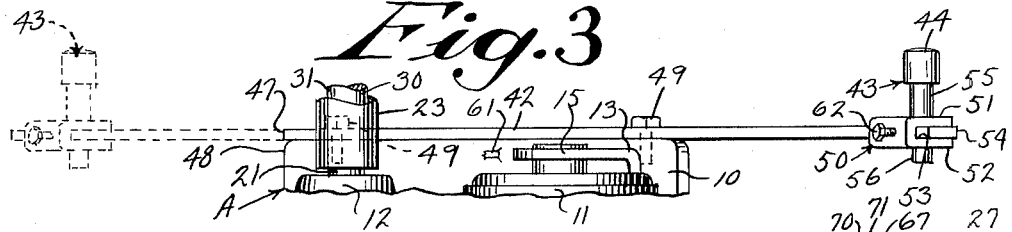
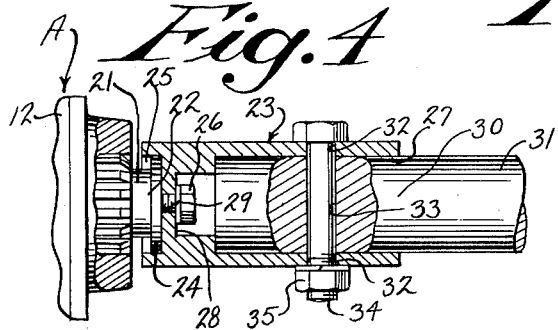
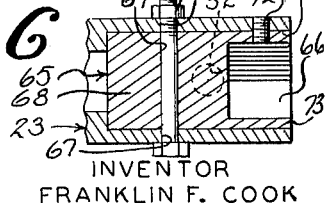
INVENTOR
FRANKLIN F. COOK
BY George W. Wright

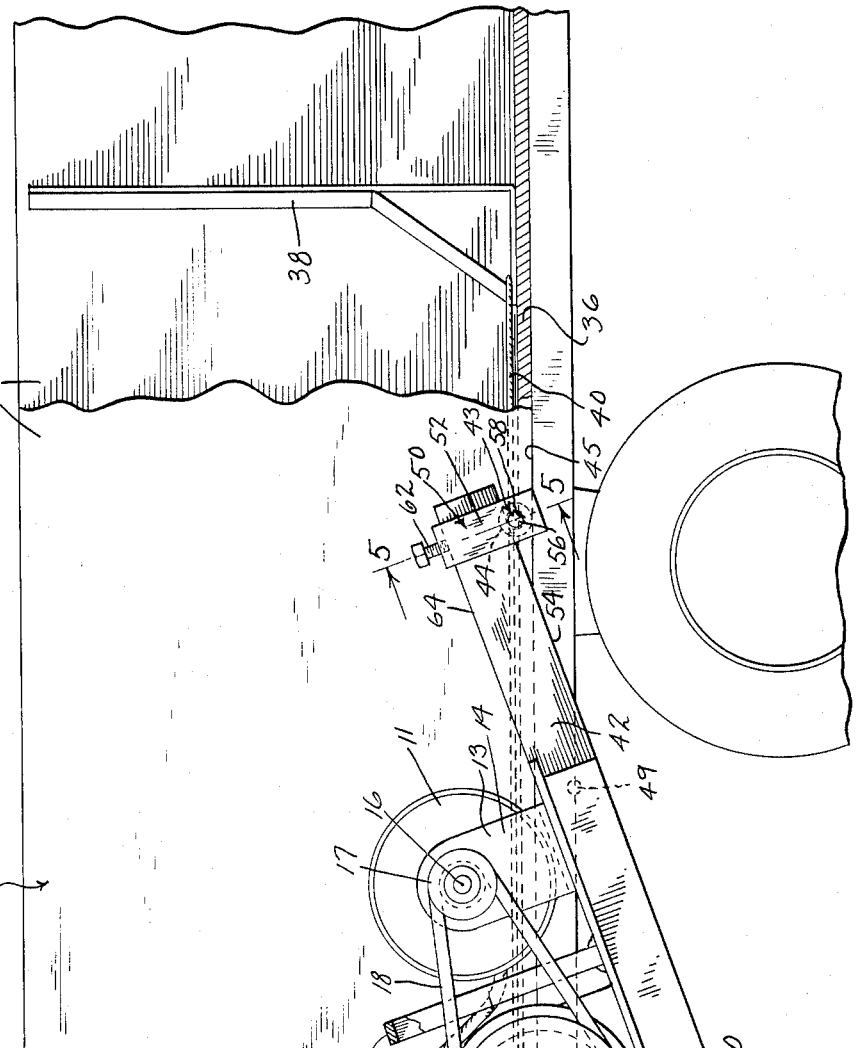
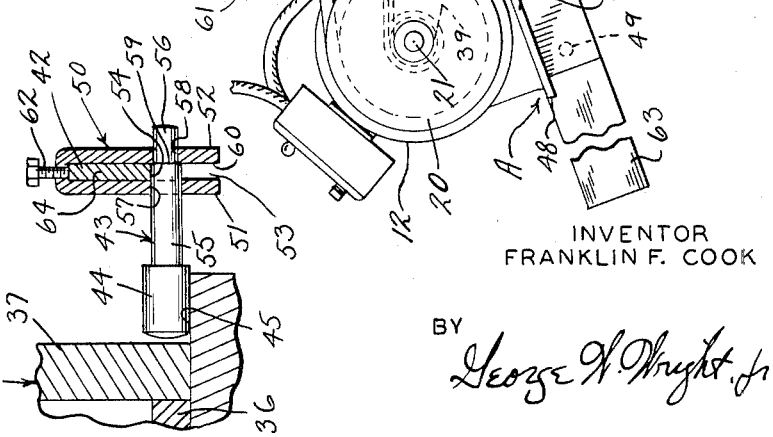

United States Patent Office 3,247,730
Patented Apr. 26, 1966

3,247,730
UNLOADING APPARATUS
Franklin F. Cook, R.R. 2, Baraboo, Wis.
Filed Sept. 30, 1963, Ser. No. 312,587
8 Claims. (Cl. 74—16)

This invention relates to unloading vehicles, and more particularly to a new and improved apparatus for unloading vehicle bodies of grain, silage, bulk material and the like.

Unloaders for farm use are furnished by a number of companies, and all include a drive means for use with either a movable bulkhead or a conveyor apron mounted within the floor of the vehicle body. Some of these unloaders are provided with power means for rotating the shaft that moves the bulkhead and/or conveyor, but in most the power take-off of the tractor is utilized or a separate power driven attachment must be provided. Due to the number of different makes of wagons and their structural differences, there is a great need for an apparatus which can be readily adapted to all known types of wagon unloaders, and which can be quickly set up, particularly to move the vertical bulkhead. It is also desirable to provide a reversing mechanism when the same is needed.

It is, therefore, a primary object of my present invention to provide a novel, portable power mechanism which can easily and quickly be attached to the shaft of the unloaders regardless of the type of wagon or type of shaft utilized.

Another important object of my present invention is to provide a novel apparatus which can be particularly associated with the shaft utilized to move the bulkhead wall and which can be quickly coupled to the shaft and has a novel torque bar with means for associating the same with the wagon body regardless of its structure.

Still another object is to provide a novel apparatus having a base carrying a single power unit in side-by-side relationship with a gear reduction unit of a relatively small size and light weight, having a handle situated between the two units, wherein the same are in balance so that the base power unit and gear reduction unit can be easily lifted by one man and quickly associated with the shaft and vehicle.

A further object of the invention is to provide a novel adapter which can be easily removed from the drive shaft of the gear reduction unit and which carries means to associate the same with either the round shaft of the wagon, or square shaft.

Another important object of my present invention is to provide a novel, portable power unit of a relatively small size that can be mounted on the vehicle body in close quarters, and used when the same is maneuvered and placed close to buildings and other objects, the unit being provided with a torque bar which may be readily moved from one side of the unit to the other, so that the power unit itself can be attached to either end of the shaft of the vehicle.

A further object of my present invention is to provide a novel torque pin which is adjustably secured to the torque bar by a saddle clamp which cooperates with the pin to clamp the pin to the torque bar in a novel manner, in such a way that the pin can be readily removed, saddle clamp reversed and placed on the opposite end of the bar in any position along the bar.

With the above and other objects in view, which will more readily appear as the nature of the invention is better understood, the same consists in the novel construction, combination and arrangement of parts, hereinafter more fully described, illustrated and claimed.

A preferred and practical embodiment of my present invention is shown in the accompanying drawings, in which, FIGURE 1 is a fragmentary side elevational view of a vehicle body of the type having a slidable vertical bulkhead, showing my novel power unit in operative position thereon;

FIGURE 2 is a fragmentary top elevational view of the wagon body and power unit shown in FIGURE 1 of the drawings;

FIGURE 3 is a fragmentary top plan view showing the preferred structure of my novel torque bar, the torque bar shown associated with the right side of a vehicle in full lines, and its position in dotted lines being when it is associated with the left side of the vehicle;

FIGURE 4 is an enlarged fragmentary section taken through my novel adapter and showing the structure of the same when associated with a round end of the power shaft of the vehicle;

FIGURE 5 is a transverse section through my torque bar and my novel means for associating the torque pin with the bar and vehicle, and FIGURE 6 is a fragmentary section taken through my novel adapter similar to FIGURE 4 of the drawings, but showing an additional fitting in the adapter when the same is to be associated with a square end of the power shaft of the vehicle.

Referring now to the drawings in detail, wherein similar reference characters designate corresponding parts throughout the several views, the letter W generally indicates one type of a wagon unloading vehicle, and the letter A generally indicates my novel power unit and apparatus.

Referring now particularly to FIGURES 1 and 2 of the drawings, it can be seen that my novel power unit and apparatus includes broadly a substantially flat, rectangular shaped base 10 to one end of which is securely mounted the electrical motor 11 and to the other end of which is secured the gear reduction unit 12. While the motor 11 and gear reduction unit 12 may be of any standard make, it should be noted that the particular arrangement of the motor and gear reduction unit side-by-side and slightly spaced one from the other lends to the ease and portability of the complete device, and also enables me to utilize a relatively small Air Force surplus gear reduction unit. The motor is mounted to the base by means of the inverted, U-shaped bracket 13, carrying the upstanding supporting arms 14 and 15, respectively. The outer end of the motor drive shaft 16 has secured thereto a pulley 17 and this pulley is in drive connection by means of the belt 18 with the large pulley 20 of the gear reduction unit. The drive shaft 21 of the gear reduction unit 12 has secured to its outer end 22, means for detachably carrying the adapter 23. This means includes broadly an outer rim 24, which is keyed or splined and aligned with the reduced portion 25 of the adapter 23. The outer end of this shaft 21 at the axial center thereof is provided with a threaded bore to receive the threaded nut 26 and it should be noted that the adapter 23 is of cylindrical shape, open at the end 27, and closed by the wall 28 at its other end. The wall 28 is also provided at its axial center with the aperture 29 through which the threaded bolt 26 extends. Thus, it can be seen that the adapter is firmly secured to the shaft 21 and will rotate therewith.

To accommodate the rounded end 30 of the shaft 31 of the vehicle W the inner portion of the cylindrical adapter is correspondingly shaped, and a pair of apertures 32 will be provided for alignment with the transverse bore 33 of the shaft 31, and the coupling is completed by providing a headed bolt 34 which extends through the adapter apertures 32 and shaft 31 and is secured by means of the nut 35.

If a type of vehicle is provided wherein the end of the power shaft 31 is of a square shape, it is obvious that the adapter 23 is then provided with a correspondingly shaped square open end 27.

As previously mentioned, the vehicle unloading body per se may be of any desired type, but for the purposes of illustration, I have shown the wagon body W as the type having a floor 36, side walls 37, a vertical sliding bulkhead 38 and the power shaft 31, which is carried in the brackets 39 of the wagon W. The vertical bulkhead 38 is moved along the floor 36 of the vehicle body by the ropes or cables 40 which are wound about the shaft 31 as this shaft is rotated by my novel power unit. In some types of vehicles, means is provided whereby a reversing of the shaft will reverse the movement of the bulkhead 38 and this can be readily accomplished by providing a reversible motor 11. As can be seen the adapter 23 is secured to and hangs directly on the end of the shaft 31 and therefore, in order to prevent the rotation of the power device A, I provide a novel torque bar 42, to the end of which is adjustably carried a torque pin 43, and the enlarged outer end 44 rests on the edge 45 of the wagon floor 36. Obviously, if my novel power device is to be used with the opposite end 46 of shaft 31, either the torque bar or torque pin must be moved to the opposite side of the device. In the preferred form of the invention, the torque bar 42 terminates at the point 47 adjacent the side edge 48 of the base 10, and when associated with the opposite side of the vehicle the bolts 49 which hold the bar in place are removed, the bar moved from its full line position FIGURE 3, to its dotted line position, and the bolts again firmly secured in place. The structure of the saddle 50 for the torque pin 43 is important and will now be described in detail.

Attention is therefore directed primarily to FIGURES 1 and 5 of the drawings, in which it can be seen that the saddle 50 is formed from a single piece of metal to provide an inverted U having the depending legs 51 and 52 respectively. These legs define a longitudinally extending slot 53 of a size and configuration to completely receive the torque bar therebetween, and it should be noted that the depending legs 51 and 52 terminate below the lower edge 54 of the torque bar 42. The torque pin 43 as previously brought out, includes the enlarged head 44, a reduced center section 55 and a further reduced end section 56. Each leg 51 and 52 is provided with an aligned circular aperture. One leg 51 is provided with the aperture 57 which is of a size and configuration to receive the reduced center section 55 of the pin and the other aperture 58 of leg 52 is of a smaller dimension to receive the reduced end section 56 of the pin. Thus it can be seen that when the pin 43 is inserted through the aperture 57 and 58, the abutment 59 formed between the reduced center section 55 and further reduced end section 56 will rest against the inner edge 60 of leg 52 and further movement of the pin will be stopped. With the saddle clamp 50 in position, shown more particularly in FIGURES 1 and 5 of the drawings, the bottom edge 54 of the torque bar 42 will rest on the reduced center section 55 of the pin, and thus it can be seen that by tightening the set screw 62 against the upper surface of the torque bar the pin 43 will be firmly clamped in position. Thus, if it is desired to attach my novel power unit to the end 46 of the vehicle shaft 31 it is only necessary to reverse the torque bar as previously stated, loosen the set screws 62, remove the pin and saddle clamp, and reverse the same, as shown in dotted line position FIGURE 3 of the drawings, and to again tighten the set screws 62, and the torque bar and pin are in position to brace the unit in operative position from the other side or end of the wagon. To increase the portability and ease of handling, I provide a handle 61 received between the motor and gear reduction unit at approximately the point of balance of the device.

It should be noted at this point that while I have shown in FIGURES 1 and 2 of the drawings that torque bar 42 extends longitudinally on both sides of the base to form end extensions 63 and 64 respectively, when a transverse conveyor is utilized with the wagon W extensions 63 would be in the way, and thus the preferred formation of the torque bar is as shown in FIGURE 3 of the drawings. However, the versatility of the saddle is well illustrated in FIGURES 1 and 2 of the drawings, since with the extensions 63 and 64 on torque bar 52, it is merely necessary when the power unit is utilized on the other end of the wagon, to remove the saddle 50 from extension 64 and place it as shown by dotted lines, FIGURE 2, to the end extension 63.

Once again, the versatility and portability of my power unit is stressed, in that, it can be utilized with all types of known chopper wagons, and vehicle unloaders for farms and the like. I have found that even on the most modern chopper wagon bodies, wherein the power device is built in, no provision has been made for reversing the operation, and that the purchase of a reverse gear is far more expensive than the cost of my novel power unit. Further, I have incorporated in my gear reduction mechanism a slip clutch which alleviates damage to my unit should the vehicle shaft jam for any reason. In certain types of wagons, the shaft 31 is in a position higher than the ledge 45 and in that event, it is obvious that my base 10 will be in a parallel position rather than at an angle, as shown. Where no ledge is provided, it is obvious that I may simply bore a hole of a size and configuration to receive the head 44 of my torque pin 43, or in some instances simply nail a support adjacent the outer edge of the wagon for this purpose.

While I have suggested that two different forms of the adapter 23 could be provided, one with a round end and one with a square end, to associate the device with various types of vehicle shafts, I prefer to provide an additional fitting 65 which is received in the cylindrical end 27 of the adapter 23 and having its open end 66 square shaped to receive the square end of vehicles utilizing that particular type of drive shaft. The adapter 23 is the same construction as that shown in FIGURE 4 of the drawings, and is provided with the aligned apertures 32 to receive the nut and bolt 34 and 35. However, in order to provide a stronger unit with the additional fitting 65, I provide an additional pair of aligned apertures 67 which are located inwardly of the aligned apertures 32 and the solid portion 68 of fitting 65 is provided with the transverse aperture 69. The transverse aperture 69 can be readily aligned with the aperture 67 and bolt 70 and its corresponding nut 71 can be provided to securely maintain the fitting in the adapter end and against rotation. In order to prevent the fitting 65 from slipping off the square end of the vehicle shaft when the same is received in its correspondingly formed square opening 66, I can provide a set screw 72 which extends out through the outer wall of the adapter and the wall 73 of the fitting and therefore will firmly hold the device to the shaft. I also wish to bring out the fact that the torque pin 43 can be placed either on the upper surface of the ledge 45 or under the same, depending on the direction of rotation imparted to the adapter 43.

The salient feature therefore of my invention resides in the side-by-side mounting and balancing of the motor and gear reduction unit, with the handle firmly secured therebetween so that my novel adapter 23 can be easily fitted on either end of the shaft and with the torque pin engaging the side of the vehicle. Therefore, while I have shown and described certain specific embodiments of my invention, it will be understood that these embodiments are merely for the purpose of illustration and description, that various other forms may be devised and that changes may be made in the proportions and minor details of construction without departing from the spirit of the invention or scope of the appended claims.

What I claim as new is:

1. An unloading apparatus for vehicles of the type having a transverse power shaft actuating the unloading means comprising, a substantially flat rectangular shaped base, a motor mounted on one end of said base and a gear reduction unit mounted on the opposite end of said base with the motor shaft and driven shaft of said gear reduction unit being substantially parallel, means connected to said motor for driving said gear reduction unit, a torque bar secured to said base and extending transversely of the longitudinal axial center of the motor shaft, and a torque pin adjustably carried on the outer end of said torque bar for engagement with a portion of the vehicle body.

2. An unloading apparatus for vehicles of the type having a transverse driven power shaft actuating the unloading means comprising, a substantially flat rectangular shaped base, a motor mounted on one end of said base, a gear reduction unit spaced from said motor secured adjacent the opposite end of said base, a drive shaft for said motor and a driven shaft for said gear reduction unit, said motor drive shaft and said gear reduction driven shaft lying in a substantially parallel relationship, means connected to one end of said motor drive shaft and to the adjacent end of said gear reduction driven shaft for imparting motion to the gear reduction unit, an adapter removably secured to the other end of said gear reduction driven shaft of a size and configuration to be connected to the transverse driven vehicle power shaft, a longitudinally extending torque bar secured to said base below said adapter and extending transversely of the longitudinal axial center of the gear reduction driven shaft, said torque bar having one end extending beyond the adjacent end of the base, a torque pin removably secured on the outer end of said torque bar for engagement with a portion of the vehicle body, and a vertically extending handle secured to said base intermediate said motor and said gear reduction unit.

3. An unloading apparatus as set forth in claim 1, wherein said gear reduction unit includes a slip clutch and wherein said motor is reversible.

4. An unloading apparatus as set forth in claim 2, wherein said torque bar may be reversed and having its end terminating beyond the other end of said base.

5. An unloading apparatus as set forth in claim 2, wherein said torque pin is removably secured on the outer end of said torque bar by means of a U-shaped saddle having depending legs extending on each side of the torque bar and terminating below said bar, each leg including an aligned aperture, one of said apertures being of a larger circumference than the other and said torque pin having a central shaft portion of a size and configuration to be received in the larger aperture and a reduced end portion of a size and configuration to be received in the smaller aperture, and a set screw engaging the upper surface of said torque bar to lock the pin in place.

6. An unloading apparatus as set forth in claim 2, wherein said means for removably securing the adapter to the gear reduction driven shaft includes a threaded bore in the axial center of the driven shaft, a transversely extending wall within said adapter having an aligned opening and a threaded bolt extending through said aligned opening and engaging the threaded bore of the driven shaft.

7. An unloading apparatus as set forth in claim 2, wherein the adapter is provided with a cylindrical open outer end, and a fitting including a cylindrical body of a size and configuration to be received in the open cylindrical end of the adapter and having an outer recess of a square shape.

8. An unloading apparatus as set forth in claim 7, wherein said fitting is provided with a transversely extending aperture and said adapter is provided with aligned apertures adapted to be registered with the transverse aperture of the fitting, and a nut and bolt received through said apertures.

References Cited by the Examiner
UNITED STATES PATENTS

| | | | |
|---|---|---|---|
| 2,522,960 | 9/1950 | Price | 74—16 |
| 2,599,741 | 6/1952 | Bishman et al. | 74—16 X |
| 2,640,613 | 6/1953 | Kuhl | 74—16 X |

BROUGHTON G. DURHAM, *Primary Examiner.*